United States Patent [19]
Perrault et al.

[11] Patent Number: 5,088,675
[45] Date of Patent: Feb. 18, 1992

[54] OVERHEAD HANGER

[76] Inventors: Frederick Perrault, 1727 Date Ave., Torrance, Calif. 90503; Raymond E. Perrault, 3845 Crest Rd., Rancho Palos Verdes, Calif. 90274

[21] Appl. No.: 611,767

[22] Filed: Nov. 13, 1990

[51] Int. Cl.⁵ .................................. F16L 3/00
[52] U.S. Cl. ............................. 248/327; 248/59; 248/70; 248/343
[58] Field of Search .......... 248/58, 59, 70, 71, 248/317, 343, 327; 403/375, 380, 408.1

[56] References Cited

U.S. PATENT DOCUMENTS

| | | |
|---|---|---|
| 459,844 | 9/1891 | Thomas . |
| 1,007,138 | 10/1911 | Peirce, Jr. . |
| 1,087,302 | 2/1914 | Kobert . |
| 1,229,427 | 6/1917 | Erismann . |
| 1,362,244 | 12/1920 | Farley ........................ 248/59 |
| 1,657,939 | 1/1928 | Rockwell . |
| 1,775,391 | 9/1930 | Fassinger . |
| 2,339,565 | 1/1944 | Goldberg et al. ............ 248/59 X |
| 2,408,907 | 10/1946 | Booth ....................... 403/380 |
| 2,997,269 | 8/1961 | Urbain et al. . |
| 3,355,132 | 11/1967 | Jenkins . |
| 3,389,524 | 6/1968 | Weber ....................... 248/317 X |
| 3,506,227 | 4/1970 | Jenkins ....................... 248/59 |
| 3,517,901 | 6/1970 | Jenkins ....................... 248/59 |
| 3,771,665 | 11/1973 | Potter . |
| 3,794,183 | 2/1974 | Colbridge . |
| 3,888,441 | 6/1975 | Rebentisch . |
| 3,923,277 | 12/1975 | Perrault et al. . |
| 4,013,253 | 3/1977 | Perrault et al. . |
| 4,032,096 | 6/1977 | Perrault et al. . |
| 4,790,060 | 12/1988 | Council et al. . |
| 4,915,534 | 4/1990 | Richards ...................... 403/245 X |
| 4,960,253 | 10/1990 | Perrault et al. . |

Primary Examiner—David L. Talbott
Attorney, Agent, or Firm—Richard F. Carr; Richard L. Gausewitz; Allan Rothenberg

[57] ABSTRACT

A support is provided for attachment to a four-sided stud welded to a supporting surface. The support includes a tube carrying a lower member adapted to connect to an item to be supported. The upper end of the tube is collapsed and given a U-shaped configuration so that it can extend around a portion of the stud. Fasteners hold the upper end of the tube to the stud.

5 Claims, 2 Drawing Sheets

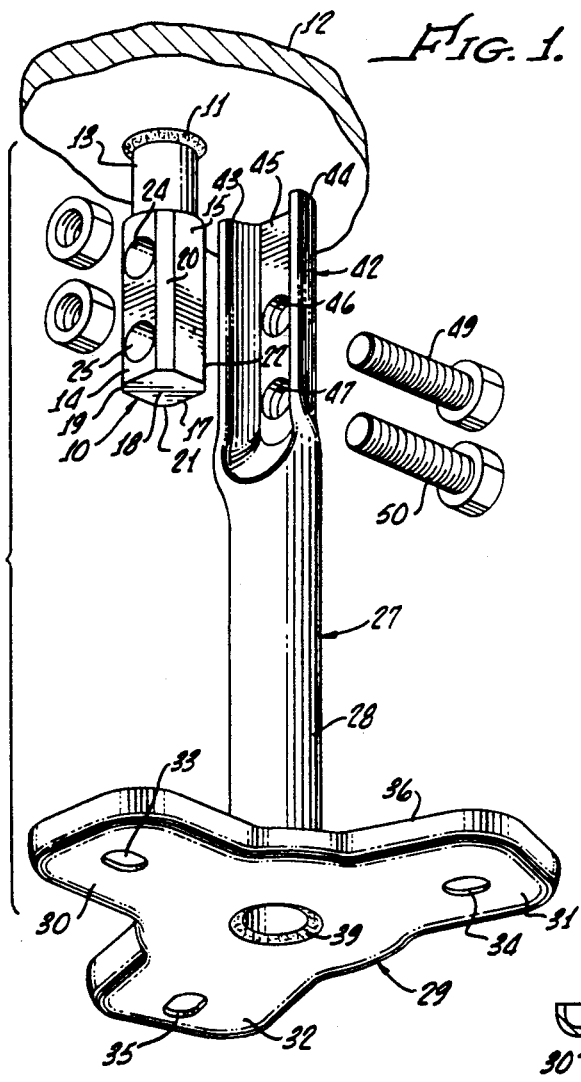
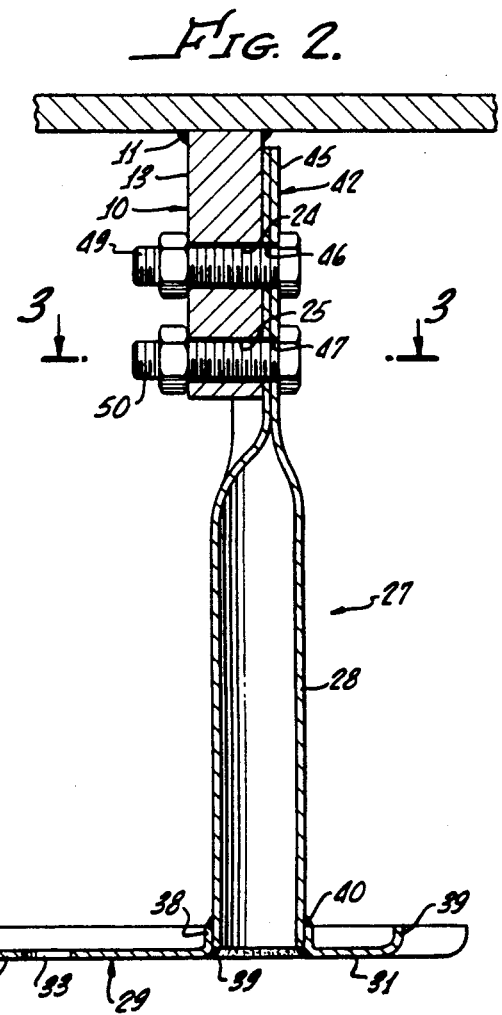
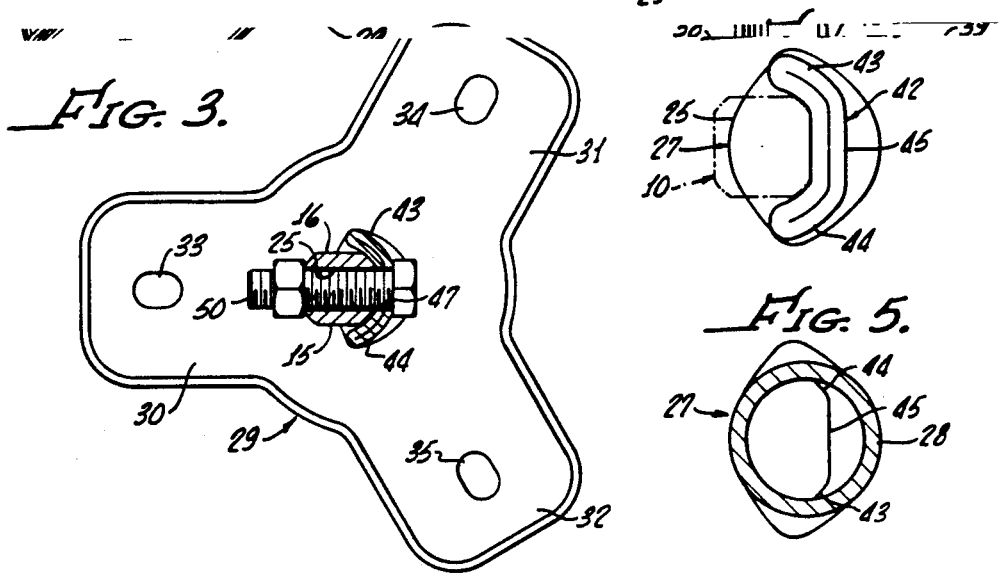
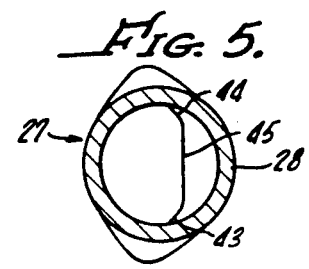

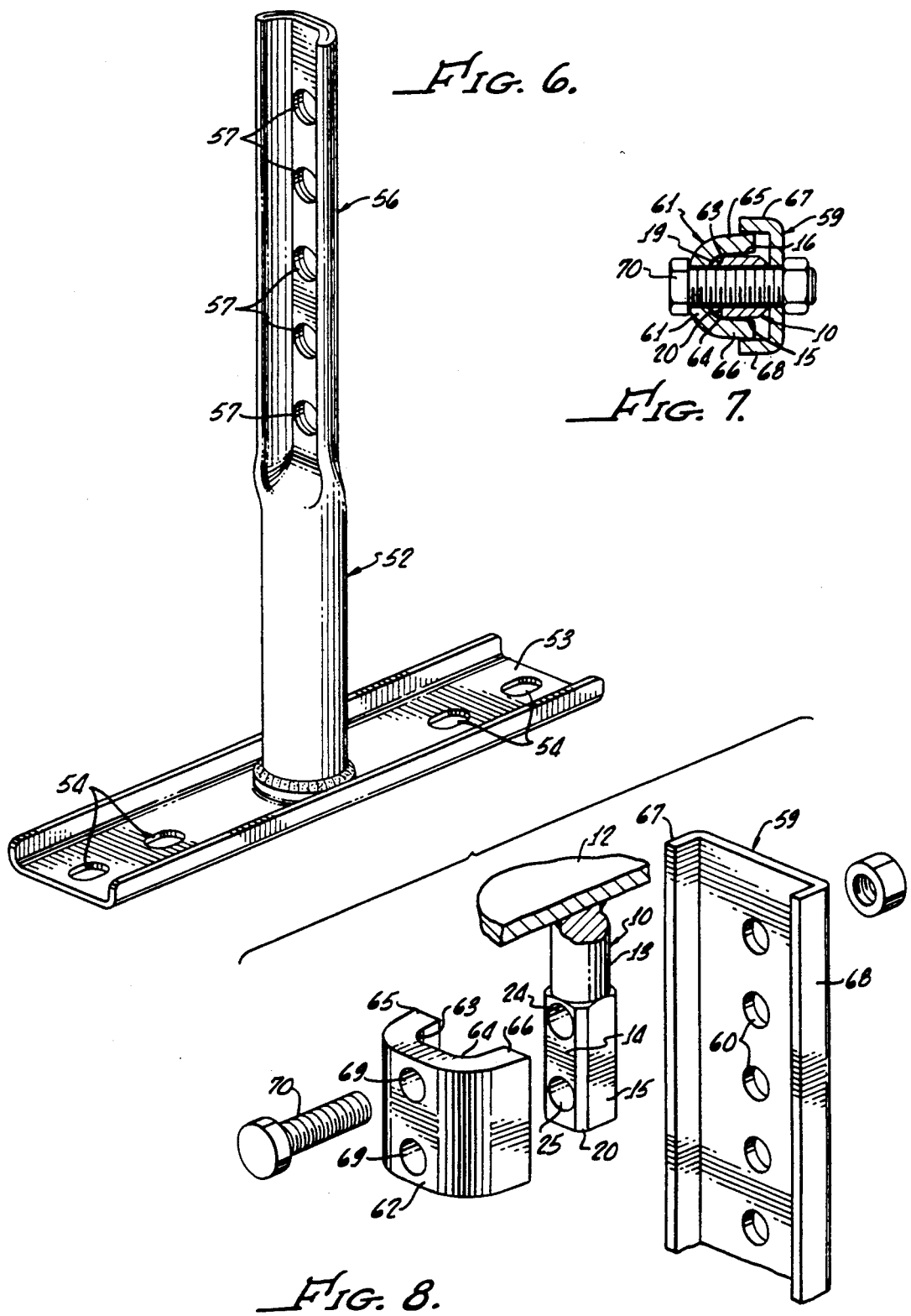

OVERHEAD HANGER

BACKGROUND OF THE INVENTION

In the construction of ships, it is customary to suspend light fixtures and other items of equipment from the deck above, or other supporting surface, so that the fixture or other item is positioned in the area desired. In the past, the arrangements for supporting light fixtures or other items of equipment have been expensive, difficult to install and unduly complex. Installation has been time consuming and costly. Adjustment of the support has not been possible.

The long-accepted way of securing light fixtures has involved a very time consuming procedure in which pipe supports are welded to a deck. This takes around one-half hour per light fixture to complete. It has been proposed to provide a threaded connection to allow a more rapid attachment. However, this has required rotation of the entire light fixture which is impossible for a light fixture of any appreciable length within the confines of narrow spaces found in both naval and commercial ships.

SUMMARY OF THE INVENTION

The present invention provides an improved support, primarily for use aboard ships, which is of simplified construction, is lightweight, economical to make, and easy to install. The attachment is strong and rigid and the position of the support may be varied.

The supporting device is adapted for use with a stud that is welded to a ship deck or other supporting surface. This type of stud ordinarily is used as the support for a vertical angle serving as the downcomer of a wireway system, and has had nothing to do with the suspension of fixtures and equipment. The stud has a cylindrical portion which is welded to the deck, beneath which is a four-sided section in which flat sides are connected by finite rounded corners. Two openings extend through the lower part of the stud. In its conventional use, the two flanges of the downcomer angle engage two of the flat sides of the stud, and bolts extend through one of the flanges and the stud to make an attachment.

The supporting device of the invention includes a bottom part which may be shaped to fit any item which is to be suspended by the support. A tubular member carries the bottom part, being welded to it, and projects upwardly from it. Both of these parts are readily produced on a punch press. The upper end portion of the tubular member is collapsed so that it provides opposite contiguous walls which are shaped to complementarily overlie one side of the stud and to extend around two of its corners. To this end, the upper part of the tubular member is given a U-shaped configuration with a generally flat central part connecting to two side flanges at rounded interior corners. Openings are provided through the collapsed portion of the tubular member to receive fasteners that connect the device to the stud. Because the upper part of the tubular member complementarily overlies one side portion of the stud, this results in a rigid secure connection.

The upper part of the tubular member may be made elongated, with a series of spaced openings through it. This permits adjustment of the length of the upper part and hence the height of the device being suspended. If the suspended device is to be at a low level, the two uppermost openings through the upper part of the tubular member are utilized. To raise the level of the suspended item, a portion of the upper end part of the tubular member may be cut off to use a different set of openings for the attachment to the stud.

The support can be bolted to the stud in only a few moments. Welding the stud to the deck occupies about thirty seconds. Therefore, the entire attachment is accomplished very rapidly It has been estimated that a savings of $90 in labor will be effected in installing each light fixture aboard a ship.

Inasmuch as the supporting device is not welded, it may be made of aluminum rather than steel. This results in a significant savings in weight over conventional techniques. This is a matter of importance, especially for naval ships which must carry enormous amounts of electronic and other equipment which undesirably raises the center of gravity.

The supporting device is removable simply by removing two bolts to allow the item supported to be repaired or replaced. In the conventional arrangement it has been necessary to cut off the support for removal, again an expensive and time consuming operation.

In a wireway system, a downcomer formed as a channel also may be attached to the stud by means of a special adapter. The latter element is a U-shaped piece that extends around part of the stud and fits between the side flanges of the downcomer. The adapter has two openings through its central portion which match the two openings in the stud as well as any two of the series of openings in the downcomer. Fasteners, therefore, can be extended through the adapter, the stud and the downcomer thereby rigidly securing the downcomer to the stud.

BRIEF DESCRIPTION OF THE DRAWINGS

FIG. 1 is an exploded perspective view of the supporting arrangement of this invention;

FIG. 2 is a longitudinal sectional view of the supporting arrangement in its secured position;

FIG. 3 is a transverse sectional view taken along line 3—3 of FIG. 2;

FIG. 4 is an upper end elevational view of the tubular member of the supporting arrangement;

FIG. 5 is a transverse sectional view taken along line 5—5 of FIG. 2;

FIG. 6 is a perspective view of a modified form of supporting arrangement which is adjustable in its length;

FIG. 7 is an exploded perspective view of an arrangement for attaching a downcomer channel to a deck or other support and FIG. 8 is a transverse sectional view illustrating the connection of the downcomer to the stud by means of an adapter.

DETAILED DESCRIPTION OF THE INVENTION

As shown in FIGS. 1 and 2, a stud 10 of conventional design is secured by a weld 11 to a deck 12 so as to form a vertical depending post. The stud 10 includes a cylindrical upper portion 13, the upper end of which is welded to the deck 12. Below the cylindrical portion 13 the stud 10 includes four flats 14, 15, 16 and 17 that extend to the bottom end 18 of the stud and are arranged in a square pattern. The flats 14 and 17 are parallel and are at right angles to the other parallel flats 15 and 16. Convexly rounded corners 19, 20, 21 and 22 interconnect the adjacent flats 14, 15, 16 and 17. Extending through the stud are two spaced cylindrical openings 24 and 25 which extend from the flat 14 to the flat 17. The axes of the openings 24 and 25 are parallel to each other and also to the flats 15 and 16.

The support bracket 27 of this invention includes a tube 28 which at its lower end carries a device configured to support a light fixture, alarm, or other item of equipment used aboard a ship. In the embodiment of FIGS. 1 through 3, the support at the bottom end of the tube 28 is a flat plate 29 having three projecting portions 30, 31 and 32 through which are formed openings 33, 34 and 35. An upstanding flange 36 extends around the periphery of the plate 29.

An opening is formed in the center of the plate 29, with a section of the plate being bent upwardly, as illustrated, so as to form a short tubular section 38 defining the wall of the opening, which has a length equal to the width of the flange 36. The tube 28 is complementarily received in the opening in the tubular section 38 of the plate 29, and a weld 39 is formed where the end of the tube 28 is opposite from the rounded corner at the lower end of the tubular section 38. An additional weld 40 is formed at the opposite end of the tubular section 38, thereby securely attaching the plate 29 to the tube 28.

The upper end portion 42 of the tube 28 is collapsed so that the opposite walls of the tube engage each other. This portion of the tube 28 is formed to a substantially U-shaped configuration, as best seen in the end view of FIG. 4. This provides opposite edge flanges 43 and 44, which are slightly curved so as to be concave on the inside. The intermediate section 45 that interconnects the flanges 43 and 44 is flat. Spaced openings 46 and 47 are formed in the intermediate portion 45 between the flanges 43 and 44.

As the device of this invention is used, the upper portion 42 of the tube 28 fits around one side of the lower portion of the stud 10. This is a generally complementary engagement with the intermediate portion 45 of the member 28 bearing against one of the flats of the stud 10 and the flanges 43 and 44 extending around and beyond two of the curved corners of the stud. In the example shown, the intermediate portion 45 bears against the flat 17 and the corners 21 and 22 are engaged by the flanges 43 and 44. The flanges extend beyond the corners 21 and 22, and are adjacent the flats 15 and 16. The openings 46 and 47 in the upper portion 42 of the member 48 match the openings 24 and 25 in the stud 10. Bolts 49 and 50 then are extended through the openings 46 and 47 and the corresponding openings 24 and 25 in the stud 10. With the nuts secured on the bolts, the attachment is complete.

This is a very strong and rigid attachment because of the way the upper portion 42 of the member 28 complementarily receives the lower portion of the stud 10. Relative movement in all directions is restricted by the engagement of the side flanges 43 and 44, as well as the intermediate portion 45 of the member 28 with the stud 10, which engagement extends for a substantial length along the stud. The strength of the connection is enhanced because of the double-walled construction at the upper end 42 of the member 28 resulting from the collapse of this portion of the member 28 so that its opposite walls are brought into interengagement.

In the embodiment of FIG. 6, the tubular member 52, which corresponds to the tube 28 of the previously described embodiment, carries a shallow channel 53 instead of the plate 29 described above. This is merely an example of the several different kinds of devices which may be attached to the tubular member of this invention. The attachment is by welding as for the attachment of the tube 28 to the plate 29. Openings 54 are provided in the channel 53 so that an item of equipment may be suspended from the channel 53 after installation.

The upper portion 56 of the member 52 has a cross-sectional configuration the same as that of the upper portion 42 of the tube 28. Thus, the upper portion 56 is adapted to complementarily receive one side portion of the stud 10. However, unlike the design of FIGS. 1 through 3, the upper portion 56 is made longer and provided with five openings 57 through it rather than only two openings. This allows the length of the support device to be varied to suit conditions encountered. To suspend an item at a low level relative to the deck above it, the top two openings 57 are matched with the openings 24 and 25 in the stud 10 so that the supporting device has a maximum effective length. If an item is to be suspended at a higher elevation, a part of the upper portion 56 is simply cut off so that the effective length of the supporting device becomes less. For example, for support at a maximum elevation, the upper portion 56 is cut off a short distance above the lower two openings 57. This reduces the length of the supporting device so that the item suspended from the channel 53 is at a higher elevation than if other openings 57 were utilized. Of course, the portion 56 may be varied in dimension so as to include more or less than the five openings illustrated in FIG. 6.

The embodiment of FIGS. 7 and 8 shows the manner in which a downcomer formed as a channel for supporting wireways may be attached to the stud 10. Here the downcomer 59 is of conventional design, being a channel with a series of openings 60 through its central web. Wireways, not shown, may be attached to the downcomer 59 such as for example illustrated in Pat. No. 4,960,253.

In order to achieve a secure connection to the stud 10, a U-shaped piece 61 is formed which has a shape generally similar to the upper portions 42 and 56 of the tubular members 28 and 52 previously described. The U-shaped piece includes a flat central portion 62 which connects through rounded corners 63 and 64 to side flanges 65 and 66. This enables the member 61 to generally complementarily receive one side portion of the stud 10. The rounded corners, such as the corners 19 and 20 of the stud, fit within the rounded corners 63 and 64 of the member 61. The side flanges 65 and 66 of the member 61 receive side portions of the stud 10, that is, the flats 15 and 16, while the outer surfaces of the side flanges 65 and 66 fit closely within the side flanges 67 and 68 of the downcomer 59. Openings 69 extend through the central web 62 of the member 61 and match the openings 24 and 25 through the stud 10.

Bolts 70 then secure the downcomer 59 and the U-shaped member 61 securely to the stud 10, as shown in FIG. 7. Because of the fit of the member 61 around the stud 10 and within the side flanges 67 and 68 of the downcomer 59, relative angular motion is precluded and the downcomer is rigidly attached to the stud 10.

The foregoing detailed description is to be clearly understood as given by way of illustration and example only, the spirit and scope of this invention being limited solely by the appended claims.

What is claimed is:

1. In combination with a stud attached to a supporting surface, said stud having a lower portion provided with four flat sides interconnected by finite convexly rounded corners, and having at least one opening extending transversely therethrough and interconnecting two of said flat sides,
 a supporting device comprising
  a first member
  a second member carried by said first member,
   said second member being adapted to be connected to a device to be supported,
   said first member being tubular,
   one end portion only of said first member being collapsed to provide two opposed contiguous walls, and being generally U-shaped so as to provide a substantially flat central part and two opposite curved side flanges, said substantially flat central part substantially complementarily overlying one of said flat sides of said stud, said curved side flanges substantially complementarily overlying two of said corners,
   said end portion of said first member having at least one opening therethrough aligned with said opening in said stud, and
  a fastener extending through said opening in said first member and said opening in said stud for thereby connecting said first member to said stud.

2. A device as recited in claim 1 in which said stud includes two openings therethrough and said portion of said first member includes two openings therethrough, one of said openings in said first member being aligned with one of said openings in said stud and the other of said openings in said first member being aligned with the other of said openings in said stud, and including a fastener extending through each set of said aligned openings for thereby securing said first member to said stud.

3. A device as recited in claim 1 in which said portion of said stud includes two spaced parallel openings, each of which extends between two of said flat sides, and in which said portion of said first member is elongated and includes more than two openings therethrough, any two of which are alignable with said openings in said stud, whereby the effective length of said first member may be adjusted by selectively removing or not removing part of said portion of said first member, and including a fastener for extending through each set of openings so aligned.

4. A device as recited in claim 1 in which said side flanges extend beyond said corners which they overlie and are adjacent two additional ones of said flat sides.

5. A device as recited in claim 1 in which said second member includes a short tubular section defining an opening therethrough, the opposite end portion of said first tubular member being substantially complementarily received in said opening, and being welded to said second tubular member at either end of said opening.

* * * * *